Figure 1:
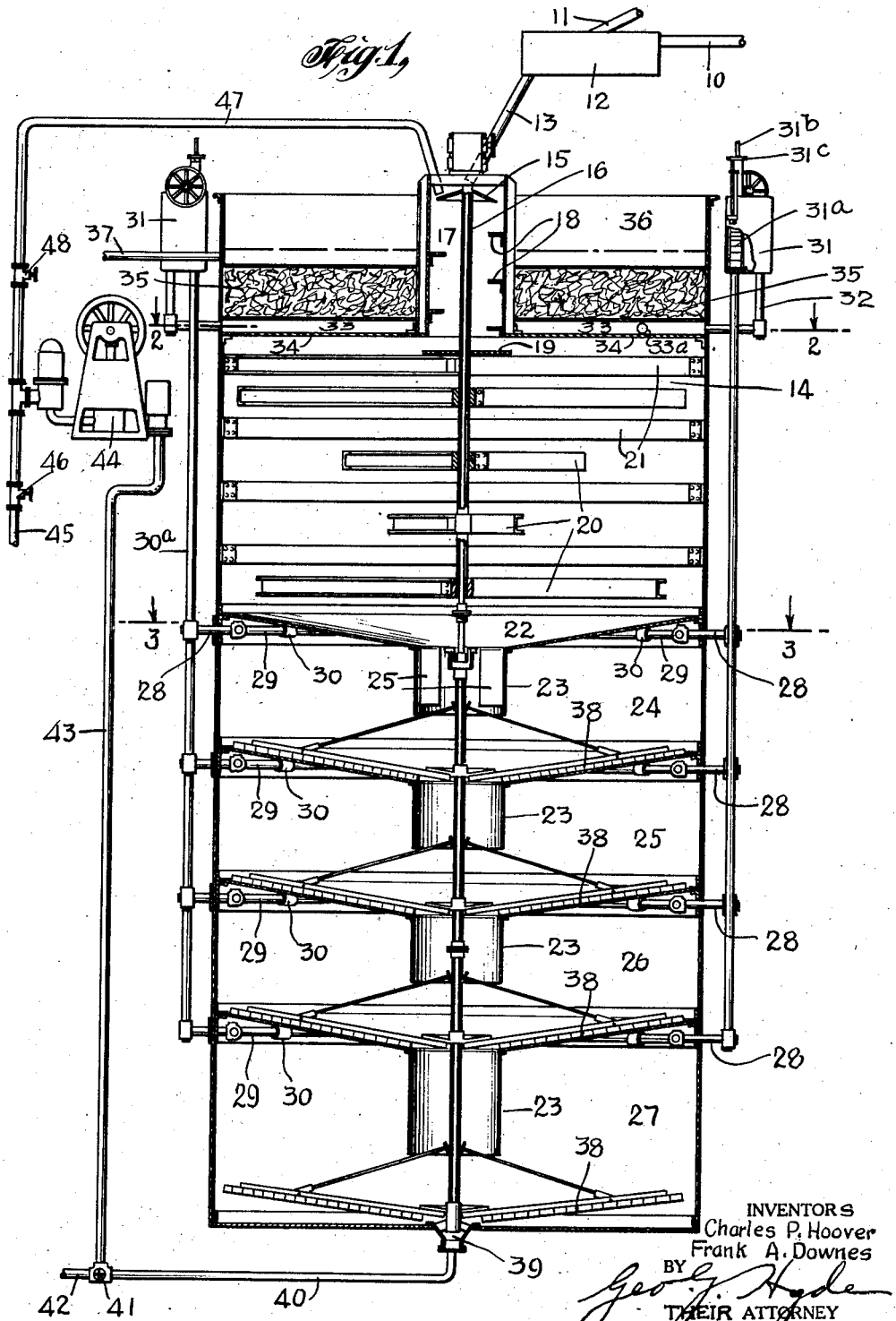

April 1, 1930.   C. P. HOOVER ET AL   1,752,795
AGITATION AND SETTLING PROCESS
Filed Aug. 7, 1925   2 Sheets-Sheet 1

INVENTORS
Charles P. Hoover
Frank A. Downes
BY
THEIR ATTORNEY

April 1, 1930.   C. P. HOOVER ET AL   1,752,795
AGITATION AND SETTLING PROCESS
Filed Aug. 7, 1925   2 Sheets-Sheet 2
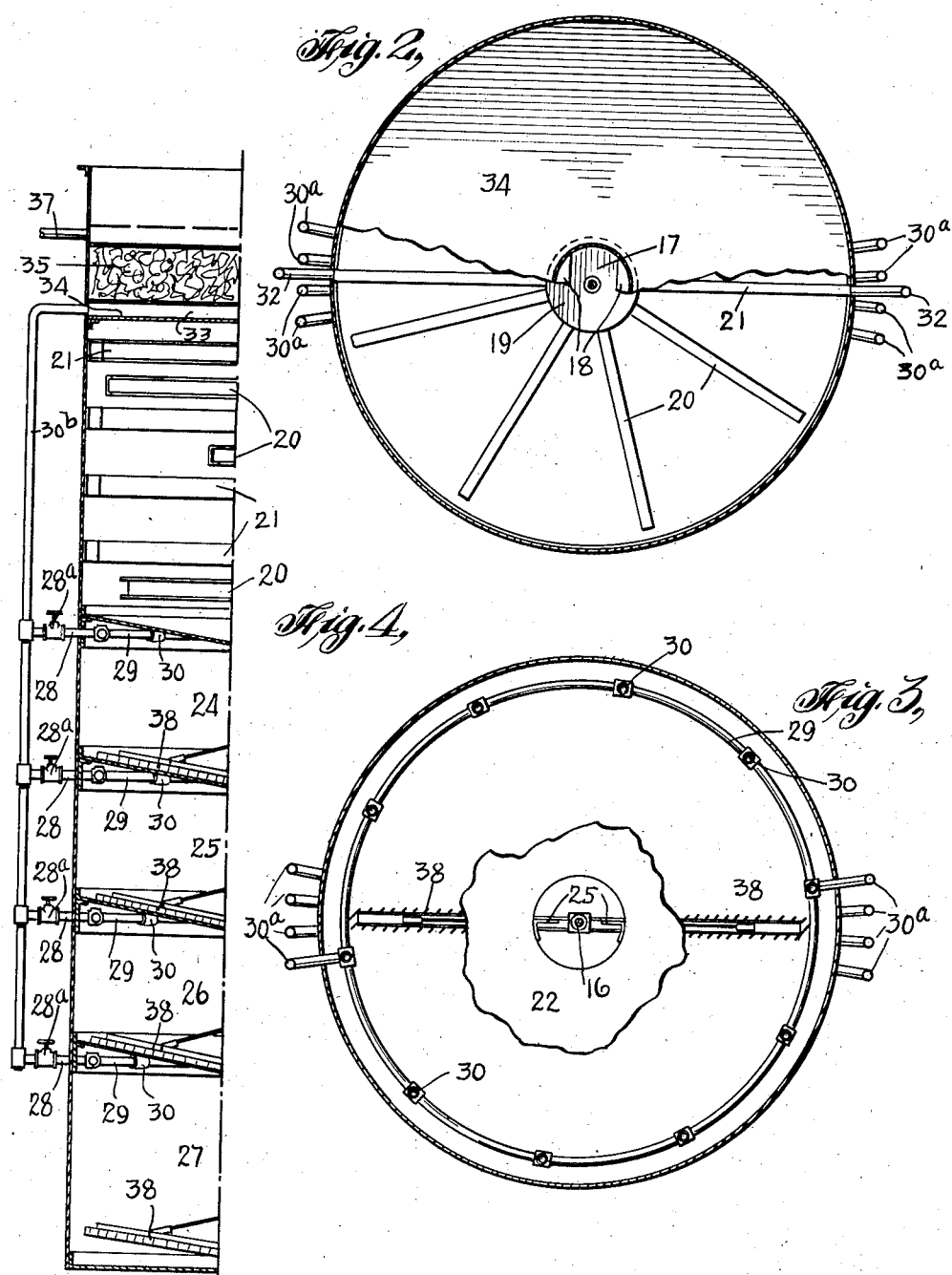
INVENTORS
Charles P. Hoover
Frank A. Downes
BY
Geo. J. Hyde
THEIR ATTORNEY Patented Apr. 1, 1930

1,752,795

UNITED STATES PATENT OFFICE

CHARLES P. HOOVER, OF COLUMBUS, OHIO, AND FRANK A. DOWNES, OF NEW YORK, N. Y.

AGITATION AND SETTLING PROCESS

Application filed August 7, 1925. Serial No. 48,802.

This invention relates generally to the treatment of liquids and suspended solids by flocculation and sedimentation, and is particularly directed to a process which includes agitation with suitable reagents followed by removal of the solids by sedimentation.

The process is especially applicable to operations in which flocculating reagents are employed to assist in sedimentation, though it may also be used where the reagents either produce a precipitate directly or assist otherwise in the removal of the solids by sedimentation. The principles governing flocculation are imperfectly understood, and empirical methods are generally necessary to develop efficient flocculation for any particular pulp or mixture of solids and liquids. It is known that chemical and electrical conditions affect extensively the formation, stability and size of flocs, which are also influenced by physical conditions such as temperature and rate of agitation. This invention is based on a control of certain of these factors which have in practice been found to have a substantial effect on the thoroughness and rapidity of removal of the solids, primarily by promoting the size and complete flocculation of solids and the production and preservation of large flocs which have a correspondingly high settling rate.

This feature is particularly valuable where solids are relatively light and therefore settle at a very low rate unless thoroughly flocculated, a condition which is encountered in industrial water softening. In this operation the use of precipitating chemicals followed by agitation and settling is standard; but a very high percentage of the solids must be removed to produce a satisfactory effluent; and it has been necessary to provide exceptionally high, large and expensive tanks or standpipes, owing to the large flows handled, the small proportion of solids, the fineness of the latter and their very low specific gravity.

An important feature of the invention is the careful control of the period and violence of agitation in the manner which has been found to produce maximum chemical effect and floc size, followed by sedimentation under conditions which do not break up the large and relatively fragile flocs, and the manipulation of a large flow of liquid in a much smaller space than has heretofore been possible without disturbing the very light precipitate.

The various steps have also been arranged so that the entire process may be continuous and substantially automatic, thereby facilitating further the reduction in size of apparatus, a feature which is of primary commercial importance in this field.

Other features of the invention will be apparent from the following description taken in connection with the accompanying drawings in which Fig. 1 is a vertical central section through one form of apparatus, Fig. 2 is a horizontal section on line 2—2 of Fig. 1 looking downward, Fig. 3 is a similar view on line 3—3 of Fig. 1, and Fig. 4 is a fragmentary vertical section similar to Fig. 1 showing a modified form of overflow arrangement.

The initial mixing of the reagents with the liquid may be carried out in any desired manner, as by the employment of the usual chemical feeders and mixing tanks. This arrangement is shown diagrammatically in the drawings, in which the liquid feed inlet 10 and reagent feed inlet 11 pass into mixing apparatus 12, which discharges through conduit 13 into the agitation compartment 14. In the form illustrated means is provided for removing any air or gas which might be entrapped, said means comprising a suitable disc or table 15 over which the liquid flows in a thin layer. The disc 15 may be of conical shape, mounted on quill shaft 16, with sufficient clearance around its edges to permit unobstructed flow of the feed into feed well 17, which communicates with the agitation chamber 14. Suitable transverse baffles 18 may be located in the feed well 17 below disc 15 to produce a certain amount of agitation of the liquid in the well and thereby assist in thorough mixing of the chemicals. A suitable distributor plate 19 may also be located immediately below the discharge end of the feed well to assure lateral distribution of the feed.

As has already been indicated, the control of the regulation of the agitation step constitutes an important feature of the invention. In the usual practice the machines are designed with the intention of providing sufficient agitation to insure simply a thorough mixture of the reagents and liquid so that a uniform maximum interaction shall take place. While this is of course important, it is not sufficient to insure the production of solids which will have the maximum settling rate. To accomplish the latter object, it is necessary according to the present invention to provide a suitable detention period in the agitator during which the mixture is maintained in a state of horizontal homogeneity, while at the same time the formation of flocs is not substantially interfered with, and when formed they are not broken down before leaving the agitation compartment. The expression "horizontal homogeneity" is used to indicate a condition in which the mixture in the agitation compartment is identical in all parts of any horizontal zone, though, where the feed is introduced at the top and discharge taken at the bottom, the condition at the top of the compartment may be substantially different from that at the bottom.

It may be noted that agitation at an insufficient rate will produce a mixture having a relatively high percentage of suspended solids with a very low settling rate. This result may be due to permitting the flocs first formed in the agitation chamber to settle through the liquid, instead of maintaining them in approximately the zone of formation so that the remaining finer solids may be picked up by the flocs; since very fine solids may be thoroughly removed if present in sufficient numbers to form large flocs to which the remaining fine particles may attach themselves, whereas a more disperse suspension of such solids will not flocculate sufficiently to produce a comparable settling rate, and often is impossible to clarify adequately by sedimentation. On the other hand, if the flocs are broken up by undue agitation, in many instances such flocs will not again re-form, the characteristics of different suspensions varying greatly in this respect for reasons which are not well understood.

A suitable arrangement for carrying out this step comprises a paddle agitator, including a plurality of radial paddles 20 revolved in any preferred manner, as by mounting them on quill shaft 16; and in order to prevent swirling and to provide an effective type of local agitation, a vertical series of fixed radial baffles 21 may be installed. For convenience the distributor plate 19 may be mounted on the top fixed baffle 21. Furthermore, in order to avoid excessive local eddies which would occur if both the fixed baffles and the paddles were in vertical alignment, the paddles 20 may be staggered around the shaft as shown.

It is important that the rate of rotation of the paddles be controlled with relation to the flow and the rate of the floc formation so that the two somewhat opposed requirements of maintaining homogeneity and of avoiding damage to flocs, particularly where a substantial detention period is provided, may both be satisfied. The detention period, speed of agitation and size and spacing of the paddles must be determined in accordance with the varying characteristics of each particular problem, and can be ascertained by standard engineering methods. For instance, in water softening, it has been found that a paddle speed of from one-half to one and three-quarters feet per second measured at a point two-thirds of the distance from the shaft to the end of the paddle, together with a detention period of fifteen to thirty minutes, would generally be satisfactory.

The thoroughly mixed and flocculated material is discharged from the bottom of the agitation compartment 14 directly into sedimentation apparatus preferably located beneath the agitation chamber and in direct communication therewith; and the passage between the agitator and settler units should be of such size and shape as to avoid any local obstructions or undue agitation which will tend to break up the flocs.

The sedimentation apparatus may comprise a suitable series of settling compartments forming a tray clarifier. In the form illustrated the bottom 22 of the agitation compartment is provided with a central discharge opening preferably having a cylindrical discharge spout or boot 23 extending downwardly from the edge of the opening so that the feed to the settling compartment 24 enters a substantial distance below the top thereof to prevent short circuiting of the feed along the top of the compartment to the overflow for clarified liquid. Suitable vertical baffle plates 25 may be employed in the boot to prevent swirling, since the lowermost paddle 20 is preferably located sufficiently close to the agitator compartment bottom 22 to keep the bottom swept clear of any accumulation.

Any number of settling compartments may be employed. In the drawings four are shown numbered 24, 25, 26 and 27, each containing a suitable overflow for decanting the clarified liquid and preferably having mechanical means therein for propelling the settled solids to a discharge. In the form illustrated the decantation system for each settling compartment comprises an overflow pipe 28 extending through the wall of the compartment and provided with a suitable inlet at the top of the compartment through which the liquid enters the pipe. For efficiency of operation, particularly where large flows are handled as in water softening, it is important that an even radial flow of the liquid from the feed inlet of the compartment to the overflow be provided to avoid local currents or channeling between feed and overflow, a condition which not only produces variations in the settling rates in different parts of the tray, with consequent loss in overall efficiency, but which also tends to disturb seriously the solids near the tray bottom particularly where such solids are relatively light or fine. For this reason it is advantageous to have pipe 28 provided with inlet means throughout substantially the entire periphery of the upper part of the compartments. This may be accomplished by employing a suitable conduit running around the upper outer margin of each compartment and in communication with the compartment at a sufficient number of points to insure substantially even flow of the supernatant liquid. This conduit may comprise a pipe 29 having a suitable number of openings 30 close to the compartment top. The arrangement is further improved by the use of two or more outlet pipes 28 for each conduit, the arrangement shown having one on each side of the tank.

Means may be provided for suitably regulating the rate of discharge of the clarified liquid, this arrangement providing a convenient means for regulating the relative amount of feed to each compartment. For this purpose each outlet pipe 28 may be connected by means of a suitable riser 30$^a$ with overflow box 31, in which the elevation of the top of each riser may be varied to control the rate of liquid discharge therefrom. One arrangement includes the employment of sliding sleeves 31$^a$ fitting closely over the upper end of each riser inside the box and supported on rods 31$^b$ threaded through a fixed support 31$^c$.

In certain industries, particularly in industrial water softening it is desirable to subject the product to a final filtration step to remove a few extremely fine particles requiring an excessive settling period, and a storage reservoir is also frequently necessary, especially where the apparatus is adapted for continuous or semi-continuous operation while the withdrawal of treated liquid may be intermittent, as is the case in the treatment of boiler feed water. One arrangement suitable for the purpose is shown, including a discharge pipe 32 from each overflow box 31 communicating with a compartment 33 directly above the top 34 of the agitation compartment. The liquid passes thence upwardly through a filter 35 of any desired type, excelsior filters being standard in railroad water softening, and accumulates above the filter in storage compartment 36. Obviously the storage arrangement would be substantially the same if the filter is omitted. A suitable discharge pipe 37 is connected to the storage space 36, and the filter 35 can be cleaned when necessary in the well known manner by opening a suitable flushing outlet 33$^a$ connected to compartment 33, the liquid in storage compartment 36 serving as a flushing backwash. An alternative method of controlling the overflow from the various sedimentation compartments is shown in Fig. 4, in which each overflow pipe 28 is connected through a valve 28$^a$ to a common riser 30$^b$, which may discharge into the space 33.

The solids settling on the bottom of each of the sedimentation compartments 24, 25, 26 and 27 are propelled to a central discharge opening by rotating inclined rakes or scrapers 38. Various methods for removing the solids are known, the preferred arrangement comprising the use of a series of registered central openings in the settling compartments through which the solids pass downwardly, the lowermost compartment 27 having a central bottom discharge opening 39. The collars or boots 23 further tend to keep the settled solids in the central discharge passage formed by said openings. The apparatus is arranged so that the sludge may be withdrawn continuously or its withdrawal may be interrupted for such periods as may be necessary, the lowermost compartment 27 serving in part as a sludge storage space if necessary. The sludge is discharged through pipe 40 either by turning a suitable three-way valve 41 to direct the sludge into the spigot discharge 42, or valve 31 may be turned to direct the sludge into riser 43 connected to the inlet of a suitable pump 44 which should be of the constant volume displacement type. Diaphragm pumps, particularly pressure pumps, are eminently suitable for the purpose.

It has been found that where flocculation is carried on in the manner indicated, efficiency of flocculation is substantially increased by introducing sludge into the agitation chamber, a step which in water softening furthermore produces a more crystalline floc which is less readily soluble. To take advantage of this fact where desirable the discharge from sludge pump 32 may be directed into the agitator feed at any desired point, and in any desired quantities. In the drawings the pump outlet communicates with a sludge discharge pipe 45 including valve 46 and also sludge return pipe 47 in which valve 48 is located. It will be apparent that suitable manipulation of these valves will determine the proportion of sludge that is returned to the agitation chamber, pipe 47 being shown as discharging into feed well 17.

As an illustrative example of one embodiment of the invention designed particularly for railroad water softening, an apparatus may be constructed having the exact proportions and arrangement shown in the drawings, in which the main tank is 20 feet in diameter, the paddles 20 and baffles 21 each 6 inches deep, with paddles 9 feet 6 inches long and 6 inch clearance between paddles and baffles respectively, the settling compartments 24, 25 and 26 four feet deep with the lowermost compartment 27 six feet deep, the agitation compartment 8 feet deep, with the paddles rotating at the rate of 2.25 revolutions per minute and the rakes 38 rotating at one revolution in 5 minutes.

It should be noted that the return of the sludge may have a number of results, such as saving of chemicals and the provision of nuclei about which flocs may form; but we believe we are the first to determine that the return of slude permits a substantial decrease in the period of contact or agitation necessary to complete the softening of the water. For instance, a contact period of one hour is generally considered necessary for adequate chemical action in water softening; but by following the present invention with return of sludge we are able to accomplish the same result in less than 45 minutes, and in general are able to complete the interaction of the reagents with the water in 30 minutes or less.

It will be understood that while the particular advantages of the process have been set forth in connection with industrial water softening, for which purpose it is particularly suitable, it may be applied to other flocculation and sedimentation problems, such as the various clarification steps in connection with the manufacture of sugar. For convenience the word "flocculant" has been employed in the claims to indicate any substance adapted to assist in the formation or preservation of flocs or the components thereof.

Claims:

1. A process of flocculation and sedimentation comprising the agitation of a fluid during flocculation for a period sufficient for substantially complete flocculation and at a rate adequate to maintain a substantially homogeneous mixture during such period but insufficient to interfere with the formation of maximum flocs; discharging the resulting mixture into a sedimentation compartment and removing the solids by sedimentation.

2. A process of flocculation and sedimentation comprising the agitation of a fluid during flocculation for a period sufficient for complete flocculation and at a rate sufficient to maintain a substantially homogeneous mixture during such period; discharging the resultant mixture into a sedimentation compartment and returning removed solids to the fluid undergoing agitation.

3. A process of continuous flocculation and sedimentation comprising continuous feed and flocculant to an agitation chamber, continuous agitation for a period sufficient for substantially complete flocculation and at a rate adequate to maintain a substantially homogeneous mixture, discharging the resultant mixture into a sedimentation compartment, and continuously withdrawing supernatant liquid therefrom.

4. A process of continuous flocculation and sedimentation comprising continuous feed of fluid and flocculant to an agitation chamber, continuous agitation for a period sufficient for substantially complete flocculation and at a rate adequate to maintain a substantially homogeneous mixture, discharging the resultant mixture into a sedimentation compartment, and continuously returning settled solids from said compartment to the agitation chamber.

5. A process of water softening by flocculation and sedimentation comprising feeding the water and softening chemicals into an agitation chamber, agitating the mixture for a period sufficient for substantially complete flocculation and at a rate adequate to maintain a substantially homogeneous mixture during such period, but insufficient to interfere with the formation of maximum flocs; discharging the resultant mixture into a sedimentation compartment and removing the soft water therefrom by decantation.

6. A process of water softening by flocculation and sedimentation comprising feeding the water and softening chemicals into an agitation chamber, agitating the mixture for a period sufficient for substantially complete flocculation and at a rate adequate to maintain a substantially homogeneous mixture during such period; discharging the resultant mixture into a sedimentation compartment, and returning settled solids from said compartment to the water during agitation.

7. A process of flocculation and sedimentation comprising the agitation of a fluid during flocculation therein for a period sufficient for substantially complete flocculation and at a rate adequate to maintain a substantially homogeneous mixture during such period; discharging the resultant mixture directly into a sedimentation compartment the uppermost portion of which is located immediately beneath the agitation chamber, and removing the solids therefrom by sedimentation.

8. A process of flocculation and sedimentation comprising the agitation of a fluid during flocculation therein for a period sufficient for substantially complete flocculation and at a rate adequate to maintain a substantially homogeneous mixture during such period; discharging the resultant mixture directly into a plurality of superposed settling compartments located immediately beneath the agitation chamber; and removing the solids by simultaneous sedimentation in said compartments.

9. A process of flocculation and sedimentation comprising continuous agitation of a fluid during flocculation, continuous discharge of the resultant mixture into a sedimentation compartment, continuous removal of the supernatant liquid by decantation therein, continuous mechanical movement of the settled solids to a point of discharge, and continuous return of settled solids to the liquid undergoing agitation.

10. A process of flocculation and sedimentation comprising the agitation of a fluid during flocculation therein for a period sufficient for substantially complete flocculation and at a rate adequate to maintain a substantially homogeneous mixture during such period; discharging the resultant mixture into a sedimentation compartment, and removing the supernatant liquid therefrom by decantation through an outlet communicating at a plurality of points with the upper part of the compartment so spaced and proportioned as to obtain an even distribution of such liquid to the outer part of the top of the compartment.

11. A process of flocculation and sedimentation comprising the agitation of a fluid during flocculation for a period sufficient for substantially complete flocculation and at a rate adequate to maintain a substantially homogeneous mixture during such period; discharging the resultant mixture into a sedimentation compartment through an enlarged space without sufficient disturbance or velocity therein to interfere with the discharge of maximum flocs; and removing the solids in said compartment by sedimentation.

12. A process of water softening by flocculation and sedimentation comprising feeding the water and softening chemicals into an agitator chamber, agitating the mixture for a period sufficient for substantially complete flocculation and at a rate adequate to maintain a substantially homogeneous mixture during such period; discharging the mixture directly into a sedimentation compartment the uppermost portion of which is located immediately beneath the mixing chamber, and removing the water therefrom by decantation.

13. A process of water softening by flocculation and sedimentation comprising continuously feeding the water and softening chemicals into an agitation chamber, continuously agitating the mixture for a period sufficient for substantially complete flocculation and at a rate adequate to maintain a substantially homogeneous mixture during such period; continuously discharging the resultant mixture by gravity directly into a sedimentation compartment located immediately beneath the agitation chamber; removing the water therefrom by decantation, and returning settled solids from said compartment to the agitation chamber.

14. A process of flocculation and sedimentation comprising the agitation of a fluid during flocculation therein for a period sufficient for complete flocculation and at a rate adequate to maintain a substantially homogeneous mixture during such period; discharging the resultant mixture into a sedimentation compartment and returning solids removed therein to the fluid undergoing agitation, by means of a constant volume displacement pump.

15. A process of water softening by flocculation and sedimentation comprising continuously feeding the water and softening chemicals into an agitation chamber, continuously agitating the mixture for a period sufficient for substantially complete flocculation and at a rate adequate to maintain a substantially homogeneous mixture during such period; continuously discharging the resultant mixture by gravity directly into a sedimentation compartment located immediately beneath the agitation chamber; removing the water therefrom by decantation, and returning settled solids from said compartment to the agitation chamber by means of a constant volume displacement pump.

16. A process of flocculation and sedimentation comprising feeding to an agitation chamber the fluid to be treated, simultaneously feeding flocculating agents to said chamber, agitating the mixture for a period sufficient for a substantially complete flocculation and at a rate adequate to maintain a substantially homogeneous mixture during such period, discharging the resultant mixture into a sedimentation compartment and returning solids removed therein to the agitation chamber feed.

17. A process of flocculation and sedimentation comprising the agitation of a fluid during flocculation for a period sufficient for substantially complete flocculation and at a rate adequate to maintain a substantially homogeneous mixture during such period; discharging the resultant mixture directly into the lower part of each of a plurality of superposed settling compartments located immediately beneath the agitation chamber; and removing the solids by simultaneous sedimentation in said compartments.

18. A process of flocculation and sedimentation comprising the agitation of a fluid during flocculation for a period sufficient for substantially complete flocculation and at a rate adequate to maintain a substantially homogeneous mixture during such period; discharging the resultant mixture directly into a plurality of superposed settling compartments located immediately beneath the agitation chamber, the mixture passing downwardly through a suitable passage at the center of the compartments, the settled solids being mechanically moved to and discharged through said passage and the supernatant liquid being removed from each compartment at a plurality of points spaced around the top of the compartment.

19. A process of flocculation and sedimentation comprising the agitation of a fluid during flocculation for a period sufficient for substantially complete flocculation and at a rate adequate to maintain a substantially homogeneous mixture during such period; discharging the resultant mixture directly into a plurality of superposed settling compartments located immediately beneath the agitation chamber; removing solids by simultaneous sedimentation in said compartments, withdrawing the supernatant liquid separately from each compartment, and regulating the proportionate feed to the various compartments by controlling the resistance to the discharge of liquid from each compartment.

20. A process of flocculation and sedimentation comprising the agitation of a fluid during flocculation for a period sufficient for substantially complete flocculation and at a rate adequate to maintain a substantially homogeneous mixture during such period; discharging the resultant mixture directly into a plurality of superposed settling compartments located immediately beneath the agitation chamber; removing the solids by simultaneous sedimentation in said compartments; withdrawing the supernatant liquid separately from each compartment and conveying it to a superposed storage compartment by hydrostatic pressure.

21. A process of flocculation and sedimentation comprising the agitation of a fluid during flocculation for a period sufficient for substantially complete flocculation and at a rate adequate to maintain a substantially homogeneous mixture during such period; discharging the resultant mixture directly into a plurality of superposed settling compartments located immediately beneath the agitation chamber; removing the solids by simultaneous sedimentation in said compartments, withdrawing the supernatant liquid separately from each compartment, and returning settled solids to the agitation chamber.

22. A process of flocculation and sedimentation comprising the agitation of a fluid during flocculation for a period sufficient for substantially complete flocculation and at a rate adequate to maintain a substantially homogeneous mixture during such period; discharging the resultant mixture directly into a plurality of superposed settling compartments located immediately beneath the agitation chamber; removing the solids by simultaneous sedimentation in said compartments, withdrawing the supernatant liquid separately from each compartment, and returning settled solids to the agitation chamber at a uniform rate independent of the rate of accumulation of the solids.

23. A process of flocculation and sedimentation comprising the addition of softening reagents to water, substantial completion of the reaction between the water and such reagents during an agitation period of not more than 45 minutes, separation of the solids from the bulk of the liquid in the resultant mixture, and return of at least a portion of such solids to the agitation step.

24. A process of flocculation and sedimentation comprising the addition of softening reagents to water, substantial completion of the reaction between the water and such reagents during an agitation period of not more than 30 minutes, separation of the solids from the bulk of the liquid in the resultant mixture, and return of at least a portion of such solids to the agitation step.

In witness whereof we have signed our names hereto.

CHARLES P. HOOVER.
FRANK A. DOWNES.

CERTIFICATE OF CORRECTION.

Patent No. 1,752,795.                                    Granted April 1, 1930, to

CHARLES P. HOOVER ET AL.

It is hereby certified that error appears in the printed specification of the above numbered patent requiring correction as follows: Page 4, line 16, for the misspelled word "slude" read "sludge", and line 62, claim 3, before "and" insert the words "of fluid"; and that the said Letters Patent should be read with these corrections therein that the same may conform to the record of the case in the Patent Office.

Signed and sealed this 13th day of May, A. D. 1930.

M. J. Moore,
(Seal)                                       Acting Commissioner of Patents.